US010625218B2

(12) United States Patent
Glaninger et al.

(10) Patent No.: US 10,625,218 B2
(45) Date of Patent: Apr. 21, 2020

(54) MOUNTING DEVICE FOR AN AERATION ELEMENT AND AERATOR

(71) Applicant: AQUACONSULT ANLAGENBAU GMBH, Traiskirchen (AT)

(72) Inventors: Gerald Glaninger, Kaltenleutgeben (AT); Robert Lugmair, Guntramsdorf (AT); Josef Köberl, Traisen (AT)

(73) Assignee: AQUACONSULT ANLAGENBAU GMBH, Traiskirchen (AT)

( * ) Notice: Subject to any disclaimer, the term of this patent is extended or adjusted under 35 U.S.C. 154(b) by 109 days.

(21) Appl. No.: 15/308,228

(22) PCT Filed: Apr. 30, 2015

(86) PCT No.: PCT/AT2015/050108
§ 371 (c)(1),
(2) Date: Nov. 1, 2016

(87) PCT Pub. No.: WO2015/164900
PCT Pub. Date: Nov. 5, 2015

(65) Prior Publication Data
US 2017/0050155 A1 Feb. 23, 2017

(30) Foreign Application Priority Data
May 2, 2014 (AT) .............. GM50067/2014

(51) Int. Cl.
*B01F 3/04* (2006.01)
*F16L 3/00* (2006.01)
(Continued)

(52) U.S. Cl.
CPC ........ *B01F 3/0412* (2013.01); *B01F 3/04269* (2013.01); *C02F 3/20* (2013.01);
(Continued)

(58) Field of Classification Search
CPC ................ B01F 3/0412; B01F 3/04269; B01F 2003/04205; B01F 2003/04198;
(Continued)

(56) References Cited

U.S. PATENT DOCUMENTS 3,295,806 A   1/1967   Modeme
4,408,742 A   10/1983  Korb
(Continued)

FOREIGN PATENT DOCUMENTS

AT   506717 A1   11/2009
CH   532532 A    1/1973
(Continued)

OTHER PUBLICATIONS

"Elasticity (physics)" Wikipedia published Feb. 29, 2012 (Year: 2012).*

(Continued)

*Primary Examiner* — Stephen Hobson
(74) *Attorney, Agent, or Firm* — McCoy Russell LLP

(57) ABSTRACT

The invention relates to a mounting device (8) for an aeration element (2) for introducing a gas into a liquid, said aeration element (2) comprises a base body (3) having at least one upwardly-projecting sidewall (6), said mounting device comprises a mounting element (9) for connecting to the sidewall (6) of the base body (3) of the aeration element (2). Said mounting element (9) comprises at least one elastically deflectable retaining web (10) for detachably connecting to the at least one sidewall (6) of the base body (3) of the aeration element (2). The invention also relates to an aerator with said type of mounting device (8).

5 Claims, 10 Drawing Sheets

(51) Int. Cl.
*C02F 3/20* (2006.01)
*F16L 3/02* (2006.01)

(52) U.S. Cl.
CPC .............. *C02F 3/201* (2013.01); *F16L 3/006* (2013.01); *F16L 3/02* (2013.01); *B01F 2003/04198* (2013.01); *B01F 2003/04205* (2013.01); *B01F 2003/04312* (2013.01); *C02F 2203/006* (2013.01); *Y02W 10/15* (2015.05)

(58) Field of Classification Search
CPC ... B01F 2003/04312; F16L 3/006; F16L 3/02; C02F 3/20; C02F 3/201; C02F 2203/006; Y02W 10/15; B65D 67/02; F17C 13/08
See application file for complete search history.

(56) References Cited

U.S. PATENT DOCUMENTS

| | | | | |
|---|---|---|---|---|
| 4,410,027 | A * | 10/1983 | Lucous | E06B 3/285 160/380 |
| 5,015,421 | A | 5/1991 | Messner | |
| 7,255,333 | B2 * | 8/2007 | Casper | B01F 3/0412 261/122.1 |
| 8,251,353 | B2 * | 8/2012 | Meyer | B01F 3/0412 261/122.1 |
| 9,561,480 | B2 * | 2/2017 | Jaeger | C02F 3/201 |
| 10,105,659 | B2 * | 10/2018 | Jaeger | B01F 3/04262 |
| 2008/0251954 | A1 * | 10/2008 | Casper | B01F 3/04269 261/122.1 |
| 2011/0057334 | A1 * | 3/2011 | Doppler | B01F 3/04269 261/64.1 |
| 2011/0248414 | A1 * | 10/2011 | Reilly | C02F 3/201 261/122.1 |
| 2014/0070433 | A1 * | 3/2014 | Ott | B01F 3/0412 261/122.1 |
| 2014/0264965 | A1 * | 9/2014 | Jager | B01F 3/04269 261/64.1 |
| 2015/0001744 | A1 * | 1/2015 | Mollen | B01F 3/04269 261/122.1 |
| 2016/0279582 | A1 * | 9/2016 | Berfner | B01F 3/04269 |

FOREIGN PATENT DOCUMENTS

| | | |
|---|---|---|
| DE | 1266567 B | 4/1968 |
| DE | 2257086 A1 | 7/1973 |
| DE | 8807929 U1 | 8/1988 |
| DE | 19645781 C1 | 5/1998 |
| EP | 0806400 A1 | 11/1997 |
| EP | 1107413 A1 | 6/2001 |
| FR | 2801439 A1 | 5/2001 |
| JP | H01132299 U | 9/1989 |
| JP | 2011519718 A | 7/2011 |
| WO | 2009132374 A2 | 11/2009 |

OTHER PUBLICATIONS

International Bureau of WIPO, International Preliminary Report on Patentability Issued in Application No. PCT/AT2015/050108, dated Nov. 17, 2016, WIPO, 10 pages.

ISA European Patent Office, International Search Report Issued in Application No. PCT/AT2015/050108, dated Oct. 21, 2015, WIPO, 6 pages.

Japanese Patent Office, Office Action Issued in Application No. 2017-508713, dated Mar. 5, 2019, 10 pages.

* cited by examiner

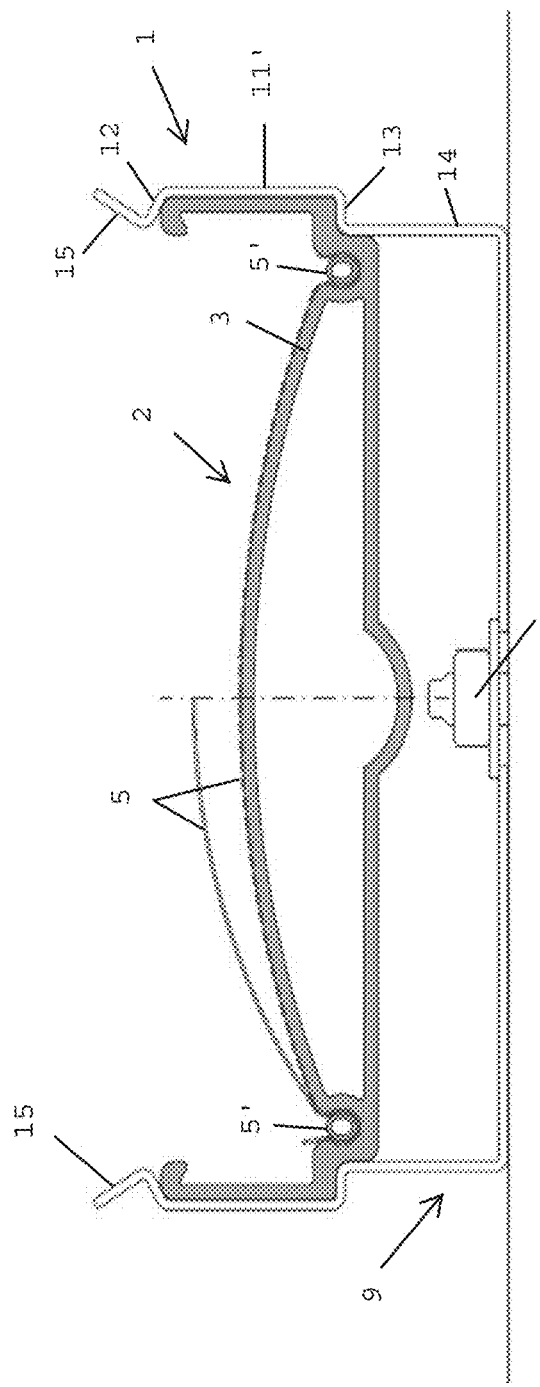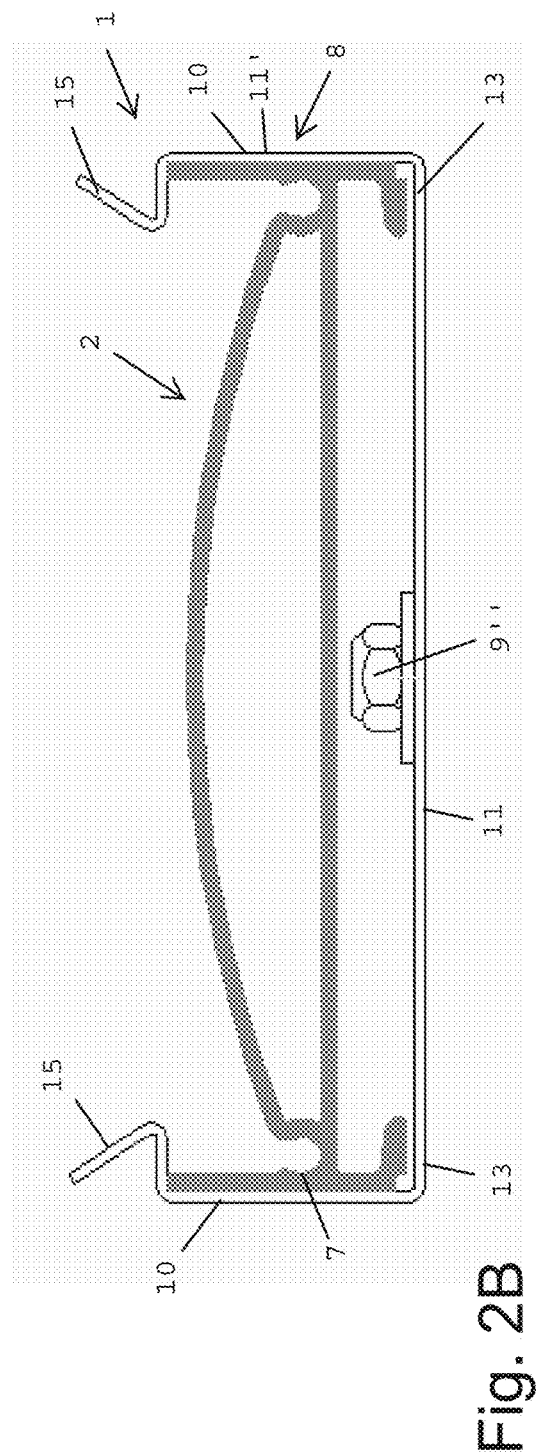

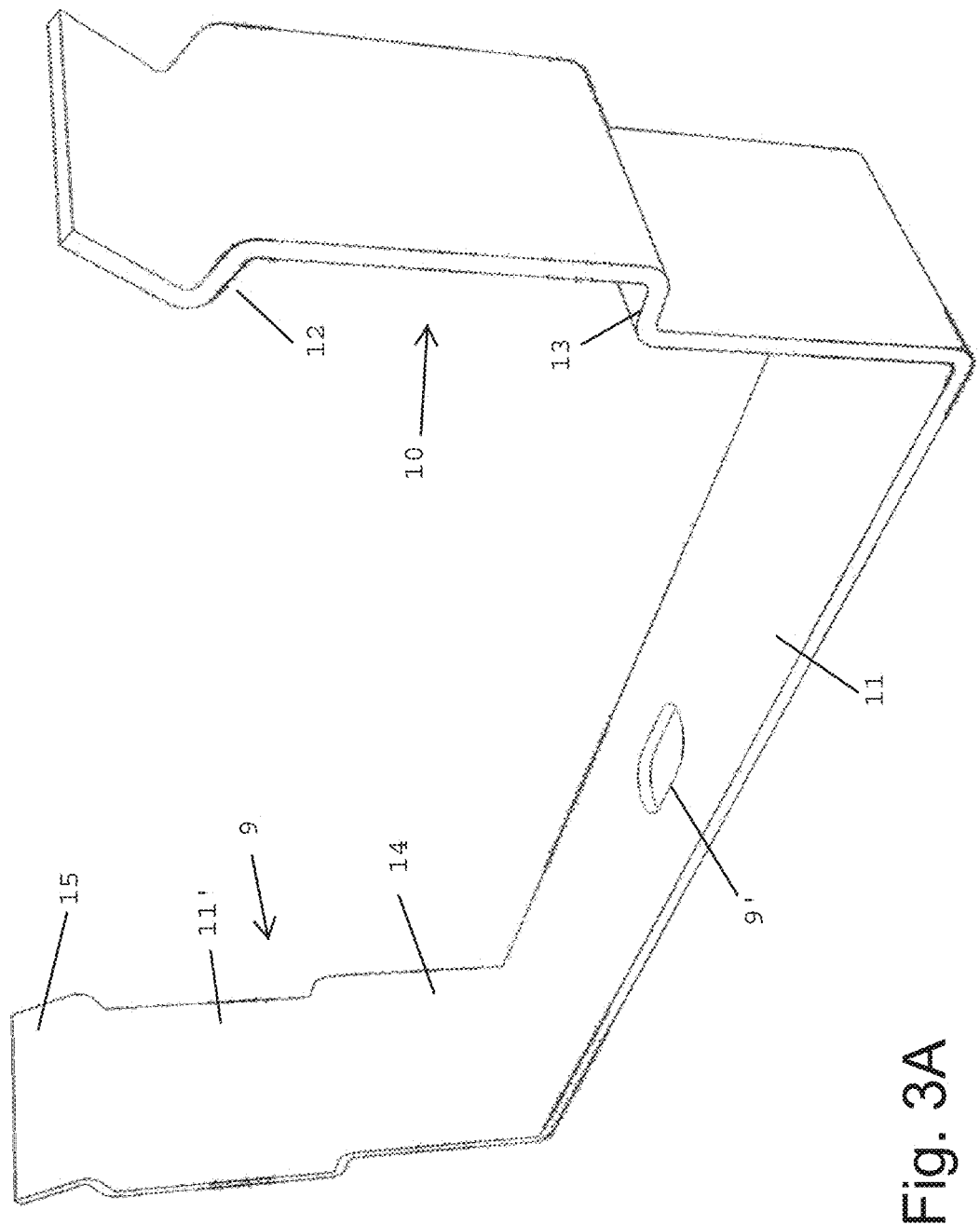

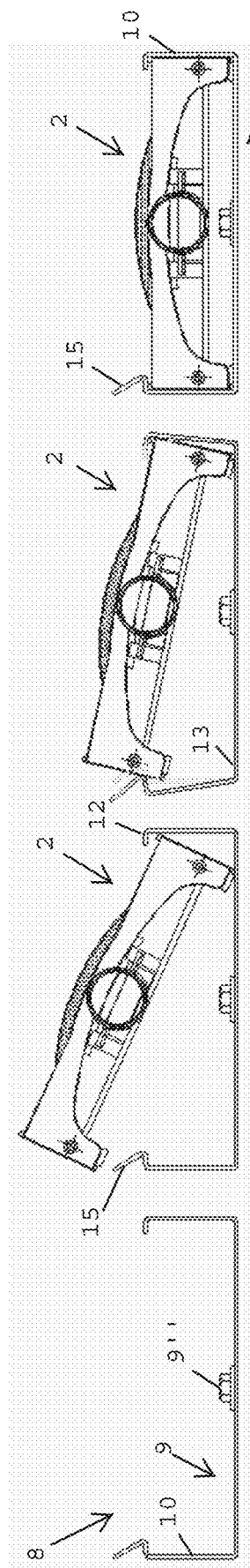

MOUNTING DEVICE FOR AN AERATION ELEMENT AND AERATOR

CROSS REFERENCE TO RELATED APPLICATIONS

The present application is a U.S. National Phase of International Patent Application Serial No. PCT/AT2015/050108, entitled "MOUNTING DEVICE FOR AN AERATION ELEMENT AND AERATOR," filed on Apr. 30, 2015. International Patent Application Serial No. PCT/AT2015/050108 claims priority to Austrian Utility Model Application No. GM 50067/2014, filed on May 2, 2014. The entire contents of each of the above-cited applications are hereby incorporated by reference for all purposes.

TECHNICAL FIELD

The invention relates to a mounting device for an aeration element for introducing a gas into a liquid, said aeration element comprising a base body having at least one upwardly-projecting sidewall, with a mounting element for connecting to the sidewall of the base body of the aeration element.

BACKGROUND AND SUMMARY

Furthermore, the invention relates to an aerator comprising an aeration element for introducing a gas into a liquid and with a mounting device for mounting the aeration element, in particular in a clarifying basin.

From AT 506 717 an aerator of the same class is known, by means of which gas bubbles are introduced into a clarifying basin or wastewater basin for the biological cleaning of wastewaters. In the gasification or aeration of wastewaters it is important that the supplied gaseous oxygen be supplied to the wastewaters in the form of fine gas bubbles, to create an exchange surface as large as possible between the gas bubbles and the wastewater. For this purpose, the aerator comprises a membrane having small openings, through which the air bubbles may be released to the wastewater. The membrane is fixed to the side portions of a plate-shaped base body with the help of locking elements in groove-shaped recesses. The base body comprises side portions that can be pushed outwards for the membrane together with the locking elements to be taken out of the clamping grooves.

Different aeration devices are described in CH 532 532 A, DE 196 45 781 C1, DE 88 07 929 U1 and EP 0 806 400 A1.

To mount the aeration device on the bottom of the clarifying basin, in the prior art the base plate is connected to a mounting plate on the bottom side. To this end, the base body comprises horizontal, inwardly projecting retaining flanges, which in the mounted state are engaged behind by corresponding cantilevers of the mounting plate. The mounting plate is screwed to the bottom of the clarifying basin on opposite sides. Basically, this mounting device functions reliably, however, it should be further improved.

Therefore, it is the object of the present invention to provide a mounting device of the above given type which has a simple construction and is inexpensive in manufacture, by means of which the mounting of the aeration element may be simplified further.

This object is solved by a mounting device for an aeration element for introducing a gas into a liquid, wherein the aeration element comprises a base body having at least one upwardly-projecting sidewall, wherein the mounting device comprises a mounting element for connecting to the sidewall of the base body of the aeration element, wherein the mounting element further comprises at least one elastically deflectable retaining web for detachably connecting to the at least one sidewall of the base body of the aeration element. Preferred embodiments are contained in the dependent claims.

In accordance with the invention the mounting element comprises at least one elastically deflectable retaining web for detachably connecting to the at least one sidewall of the base body of the aeration element.

In mounting the aeration element the retaining web can be pressed elastically outwards, in order to allow the arrangement of the aeration element in the mounting element. After completion of the loading, the retaining web returns to the initial or rest position due to its own elasticity, the aeration element being engaged positively within the mounting element. Accordingly, the base body of the aeration element and the retaining web of the mounting element can be connected to one another by a snap-fit assembly. As a result, the cost and effort of installation of the aeration element may be kept especially low. It is particularly preferred if the aeration element can be mounted between the retaining webs of the mounting element without any tools. Advantageously, it is also easily possible to remove the aeration element from the mounting element anchored in the clarifying basin. For this purpose, the retaining web of the mounting element can be pressed elastically outwards, whereupon the aeration element can be lifted out of the mounting element. Furthermore, it is advantageous that the elastically deformable retaining web involves a lower manufacturing effort than the mounting device provided in the prior art. In addition, the stability of the aerator may be increased.

To be able to connect the aeration element to the mounting device in a simple manner and, if necessary, remove it again from the mounting device, it is favorable that the mounting element has two retaining webs for detachably connecting to opposing sidewalls of the base body of the aeration element, wherein the two retaining webs are interconnected via a mounting portion that can be mounted in a clarifying basin. Accordingly, the mounting device can be mounted via the mounting portion in the clarifying basin, for example on the bottom of the clarifying basin or on a frame within the clarifying basin. Due to the flexible design of at least one of the retaining webs of the mounting element, the aeration element can be detachably mounted on the mounting device. For this purpose, the aeration element may initially be arranged in a tilted intermediate position in the mounting element, whereupon the aeration element can be pressed into its operating position. By contact with the base body, the associated retaining web is resiliently pivoted outwards from the initial position until the aeration element slides into the mounted operating position. Then, the deformed retaining web returns to its initial position, whereby the aeration element is fixed in the mounting element. In this embodiment, for this reason, the transition areas between the mounting portion and the retaining webs are formed as joints, which allow deflection of the retaining webs. To remove the aeration element from the mounting device, at least one of the retaining webs of the mounting element is deformed elastically to such an extent that the connection between the base body of the aeration element and the mounting element is released. It is also advantageous in this embodiment that, in the mounted operating state, the aeration element is held particularly stable between the opposed retaining webs of the mounting element.

To fix the aeration element, for one thing, in a transverse direction and, for the other, in a vertical direction in the mounted operating state, it is advantageous if the retaining web has a limiting portion for disposition on an outer surface of the sidewall and at least one retaining portion projecting inwardly from the limiting portion. With respect to the mounted operating state, the limiting portion is preferably arranged essentially vertically. The retaining portion is preferably arranged at an angle to the limiting portion. With respect to the mounted operating state, the retaining portion is preferably arranged essentially horizontally. The base body of the aeration element is held laterally by the limiting portion in the mounted operating state. The retaining portion also causes that the aeration element is secured against a corresponding vertical displacement in the mounted operating state. On the other hand, it is favorable if the limiting and retaining portions of the retaining web are adapted to allow a shift of the aeration element in its longitudinal direction. Preferably, the retaining web of the mounting element rests at least partially on the base body of the aeration element, so that for shifting of the aeration element the frictional engagement between the mounting element and the aeration element is overcome. Advantageously, thus the longitudinal position of the aeration element within the clarifying basin or wastewater basin easily can be adjusted.

To block any mobility of the aeration element in the mounted operating state, both upwards and downwards, it is advantageous if the retaining web has an upper and a lower retaining portion. The upper and lower retaining portions cooperate with corresponding edges of the aerator base body to fix the aeration element in the transverse direction, i. e. laterally as well as in the vertical direction.

According to a preferred embodiment it is provided that the lower retaining portion is connected to the mounting portion via a connecting portion preferably extending substantially in parallel to the limiting portion. Therefore, in this embodiment, the lower retaining portion is disposed above the mounting portion, connecting the opposite retaining webs of the mounting element to one another. A bulge is formed in the retaining web by the upper and lower retaining portions, in which bulge the sidewall of the base body of the aeration element can be arranged.

According to an alternative embodiment it is provided that the lower retaining portion is designed as a region of the mounting portion. In this embodiment, in the mounted operating state, the sidewall of the aeration element is held between the upper retaining portion and the lateral portion of the mounting portion of the mounting element.

For reasons of production, it is particularly favorable when the mounting element is formed as a one-piece profile part. This embodiment distinguishes itself by low production costs. The profile part has a cross-sectional shape staying constant in the longitudinal direction of the aeration element. Preferably, the profile part is made of steel. Alternatively, it may be provided as a plastic or fiber-reinforced plastic.

To facilitate disassembly of the aeration element, it is advantageous if the retaining web is connected at the free end to a grip element for deflecting the retaining web. For disassembly of the aeration element, the grip element can be grasped to bend the associated retaining web to the outside, so that the aeration element can be removed from the mounting device.

Moreover, for reasons of stability it is favorable when the grip element and the retaining web are designed integrally. Thereby, also the manufacturing costs can be kept low.

According to an embodiment which is particularly easy to produce, the grip element can be arranged in the same plane as the limiting portion of the retaining web. In this embodiment the grip element forms a continuation or extension of the limiting portion of the retaining web.

With respect to the manufacturing expenses, it is particularly favorable if the grip element comprises a recess which is preferably formed according to the upper retaining portion. In this way, in the production the retaining portion may be formed out of the grip element. For this purpose, cutting and bending lines may be provided in the mounting element to design the upper retaining portion. In production, initially a cutting line may be produced in a base material for the for the grip element, whereupon a portion of the grip element adjacent thereto can be bent to form the upper retaining portion.

In a preferred embodiment, the recess of the grip element is limited in sections by an edge between the upper retaining portion and the limiting portion of the retaining web. In this embodiment, in the mounted state, the upper retaining portion lies flat against the upper side of the sidewall of the aeration element. Preferably, the upper retaining portion is essentially semi-circular or trapezoidal. In this embodiment, the cutting line may correspond to the limiting line of the essentially semi-circular or trapezoidal upper retaining portion.

In another embodiment which is particularly easy to produce, the grip element has a substantially straight cutting line, wherein a portion of the grip element adjacent thereto is bent inwardly to form the upper retaining portion. In this embodiment, in the mounted state, the upper retaining portion rests on the upper side of the sidewall of the aeration element via its lower edge. The lower edge of the upper retaining portion preferably has a substantially semicircular or trapezoidal shape. A clearance preferably extending in a horizontal plane may be formed between the lower edge of the retaining portion and the substantially straight cutting line on the grip element, which clearance is connected to the recess of the grip element, which recess is formed in accordance with the retaining portion and preferably extends in a vertical plane.

Accordingly, the retaining web may comprise a further recess, which is shaped according to the lower retaining portion of the retaining web.

To facilitate handling of the mounting device during the assembly of the aeration element, it is advantageous if the grip element is preferably angled outwardly from the limiting portion of the retaining web.

In addition, due to the configuration of the mounting element it is possible that the mounting portion may comprise one, preferably exactly one mounting opening for arranging a mounting means. As compared to the prior art, the number of the mounting elements may be advantageously reduced.

To be able to adapt the arrangement of the aeration element within the clarifying basin with little effort, it is advantageous if the base body of the aeration element is arranged displaceably in a longitudinal direction between the retaining webs of the mounting element. Therefore, for displacing the aeration element, it is preferably only necessary to overcome the frictional engagement between the mounting element and the aeration element.

According to a preferred embodiment, the base body comprises a clamping groove in a lateral edge region for clamping a membrane element with passage openings for the gas, wherein the clamping groove is limited on the outside by the sidewall.

BRIEF DESCRIPTION OF THE FIGURES

Below, the invention will be further explained with reference to preferred exemplary embodiments illustrated in the drawing, however, not limited thereto, wherein in detail:

FIG. 2A is a cross-sectional view of an aerator according to the invention with an aeration element different to FIGS. 1A and 1B, a perforated membrane being schematically shown in a rest position resting on a base plate and in an aeration state lifted off the base plate.

FIG. 2B is a cross-sectional view of the aerator according to FIG. 1A.

FIG. 3A is a view of the mounting device for the aeration element according to FIG. 2A.

FIG. 4A schematically shows the first step in the assembly of the aeration element in the mounting element.

FIG. 4B schematically shows a further step in the assembly of the aeration element in the mounting element.

FIG. 4C schematically shows a further step in the assembly of the aeration element in the mounting element.

FIG. 4D schematically shows the assembled connection between the aeration element and the mounting element.

DETAILED DESCRIPTION

Figure 1A:
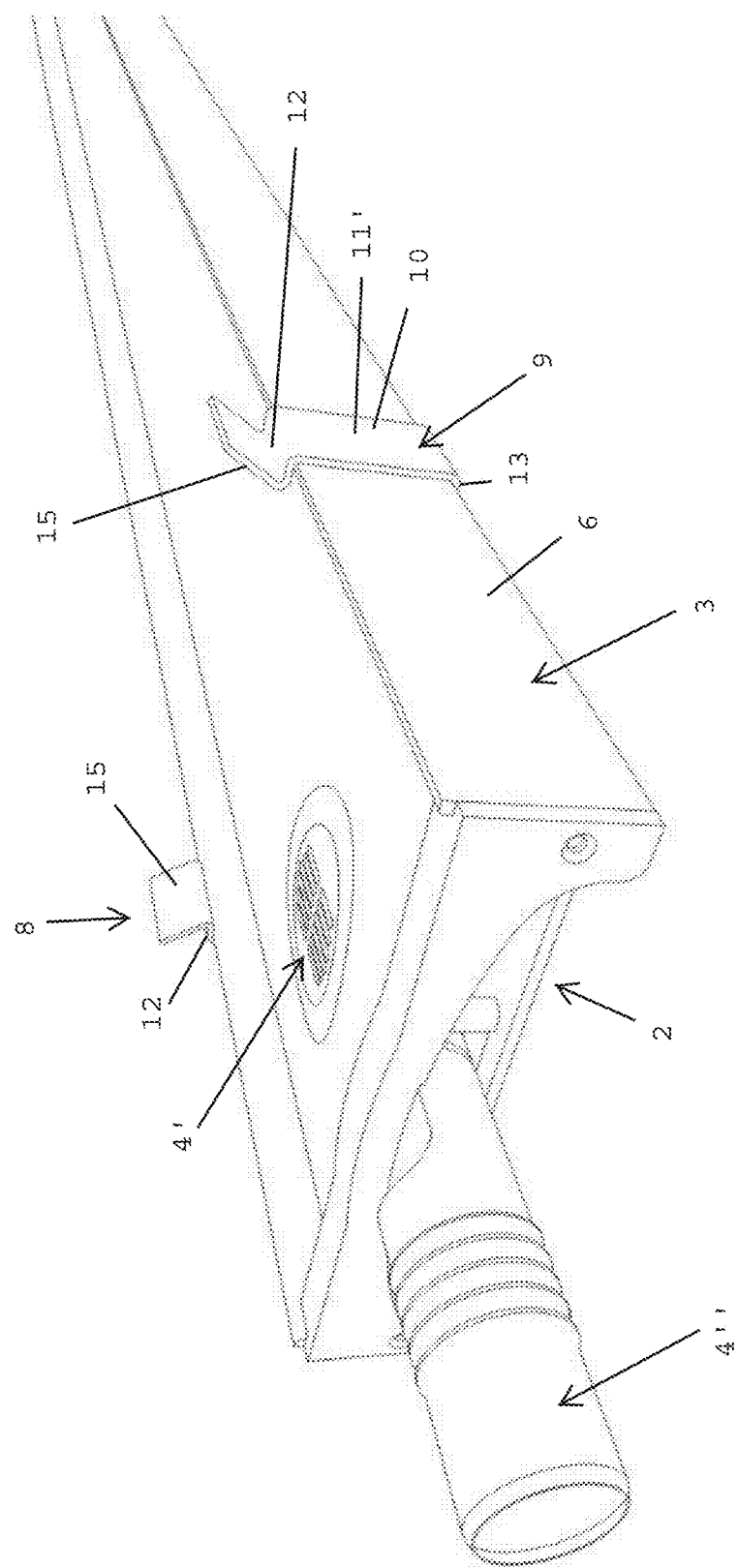
FIG. 1A is a perspective view of an aerator according to the invention, wherein an aeration element for introducing a gas into a liquid is mounted in an essentially U-shaped mounting element with elastically deformable retaining webs.

FIG. 1A shows an aerator 1, having an aeration element 2 for introducing a gas into a liquid. The aeration element 2 comprises an elongated base body 3 which may be made by a profile part known per se, in particular of plastic. On its upper side, the base body 3 comprises a curved base plate having a gas supply port 4' which is connected to gas supply means 4". Moreover, the aeration element 2 comprises a membrane element 5 (diagrammatically shown in FIG. 2A) with a plurality of passage openings for the gas, to aerate the gas in the liquid to be aerated, for example, in a clarifying basin. By supplying the gas, the perforated membrane element is lifted off the base plate 3 starting from the rest position indicated by the broken line in FIG. 2A on the base plate 3 in the aeration state indicated by a solid line. The aeration element 2 comprises on the side edges each an upwardly-projecting sidewall 6 essentially vertical in the operating state, which extends in the longitudinal direction of the aeration element 2. The base body 3 comprises at the lateral edge regions, adjacent to the sidewalls 6, each a clamping groove 7 for clamping the edge regions of the membrane element 5 by means of clamping elements 5'. The construction of the aeration element 2 per se is known from AT 506 717, which can be referred to herewith.

As can be further seen from FIG. 1A, the aerator 1 additionally comprises a mounting device 8 for mounting the aeration element 2 in the clarifying basin. The mounting device 8 comprises a mounting element 9, which in the shown embodiment comprises two retaining webs 10 for detachably connecting to the sidewalls 6 of the base body 3 of the aeration element 2. The retaining webs 10 are flexible, so that the aeration element 2 is detachably mountable in the mounting element 9 via a form fit.

As is shown in FIGS. 2A, 2B, the two opposite retaining webs 10 are interconnected by a mounting portion 11 horizontally arranged in the operating position, which is connected e.g. at the bottom of the clarifying basin or on a frame within the clarifying basin. For this purpose, the mounting portion 11 comprises a mounting opening 9' for arranging a mounting element 9", for example a screw. The mounting element 9 with the retaining webs 10 and the mounting portion 11 is formed by a one-piece profile part, preferably made of steel.

As is further shown in FIGS. 1A, 1B, 2A, 2B, each retaining web 10 has a limiting portion 11' for arranging on the outer surface of the sidewall 6 the outer surface facing away from the clamping groove 7, which limited position 11' in each case is limited by an upper 12 and a lower retaining portion 13. The aeration element 2 is fixed in the height direction by the retaining portions 12, 13. The limiting portions 11' of the retaining webs 10 cause a lateral fixation of the aeration element 2. On the other hand, the base body 3 of the aeration element 2 is arranged displaceably in the longitudinal direction thereof between the retaining webs 10 of the mounting element 9.

Figure 3B:
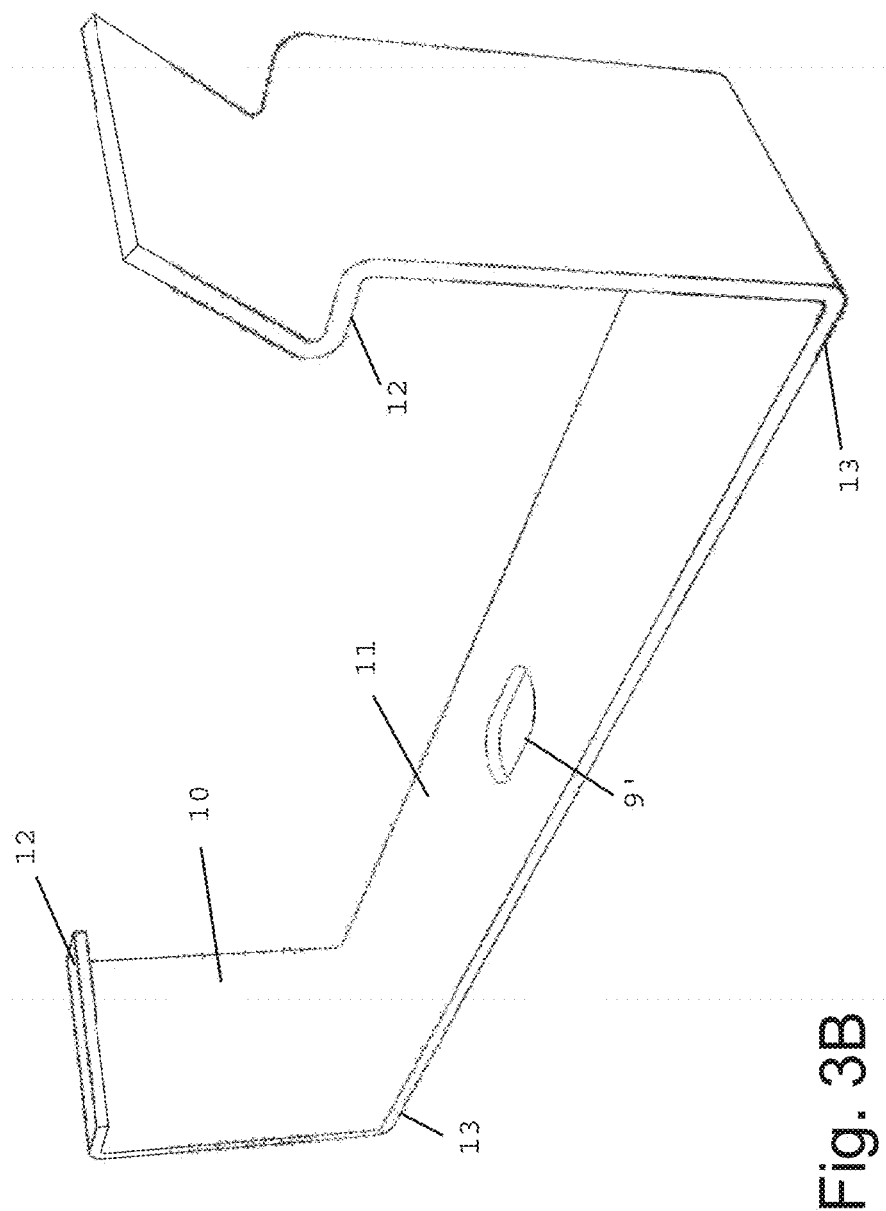
FIG. 3B is a view of the mounting device for the aeration element according to FIG. 1B.
Figure 3C:
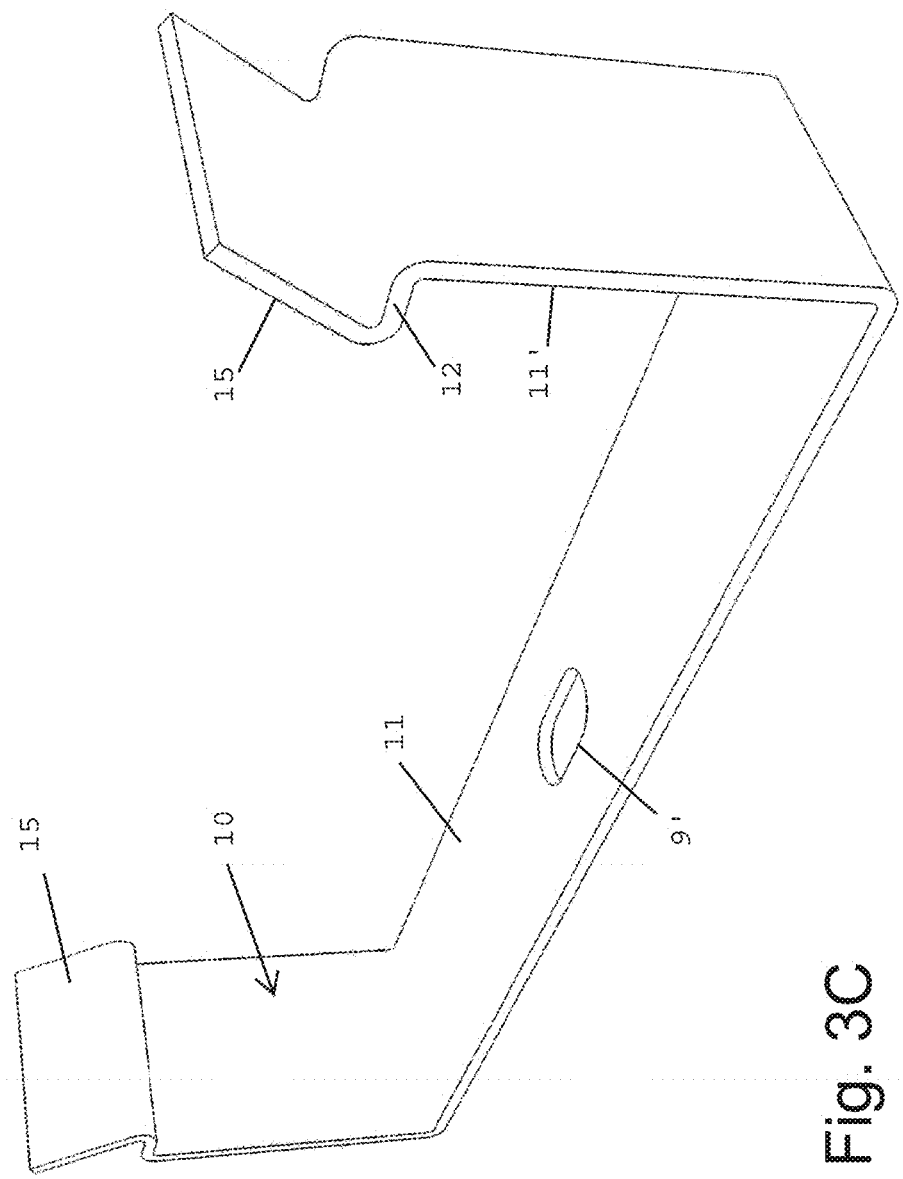
FIG. 3C is a view of an alternative embodiment of the mounting device for the aeration element according to FIG. 2B.

In the embodiment of the mounting element 9 according to FIG. 2A and FIG. 3A, the lower retaining portion 13 is connected to the mounting portion 11 via a connecting portion 14 extending essentially parallel to the limiting portion 11' and arranged essentially vertically in operation. Thus, sufficient room is created on the bottom side of the aeration element 2.

As can be further seen from FIGS. 1A, 1B, 2A, 2B, the retaining web 10 is connected at the free, upper end to a grip element 15 for resiliently deflecting the retaining web 10. The grip element 15 and the retaining web 10 are designed integrally. In the shown embodiment, the grip element 15 is angled to the limiting portion 11' of the retaining web 10 in order to facilitate handling of the mounting device 8. The mounting element 9 may have a grip element 15 on both retaining webs 10 (cf. FIG. 1A, 2A, 2B, 3A, 3C). Alternatively, the mounting element 9 may comprise such a grip element 15 only on one of the two retaining webs 10 (cf. FIG. 1B, 3B).

Figure 1B:
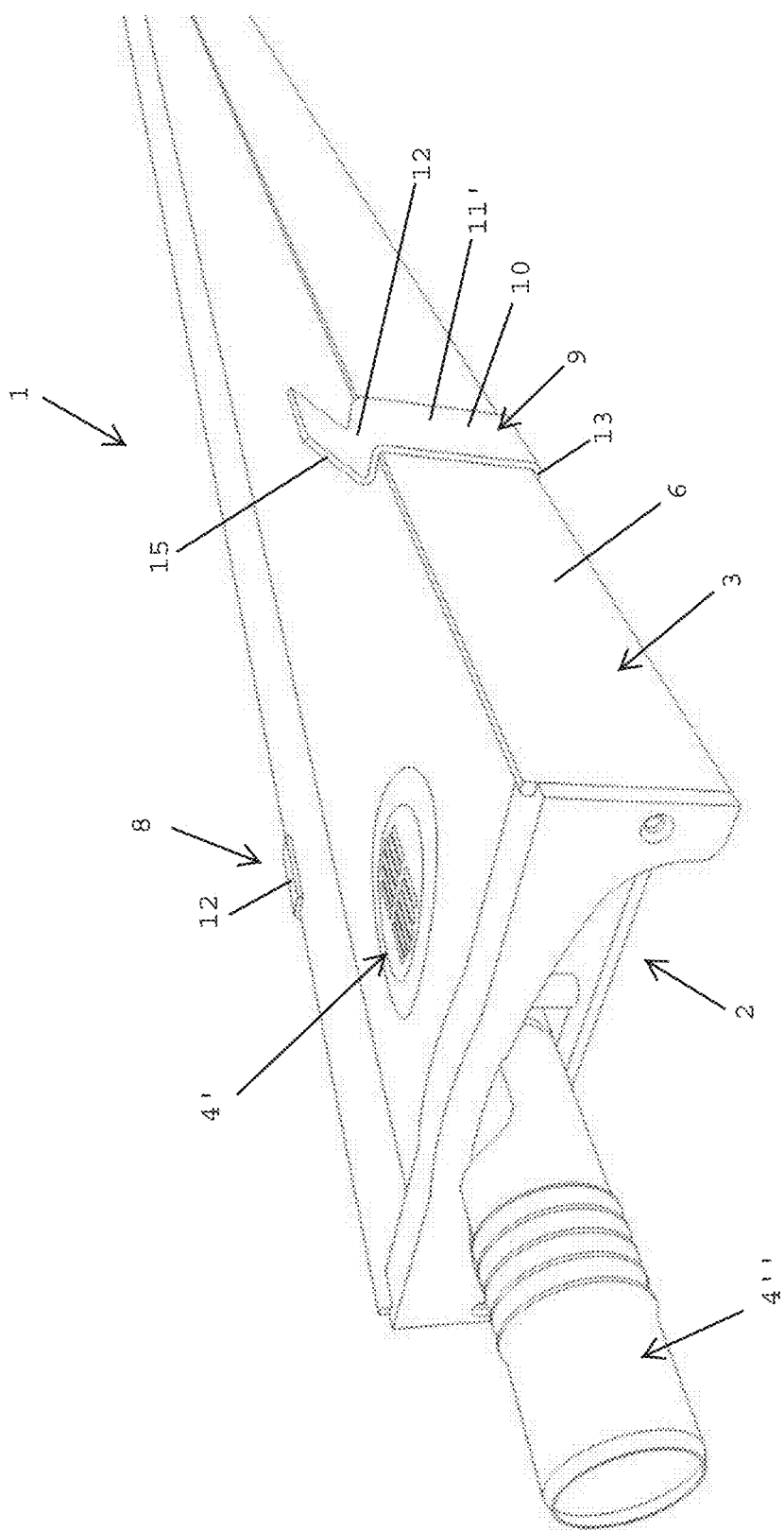
FIG. 1B is a perspective view of the aerator according to FIG. 1A, however, with a modified design of the mounting element.

FIG. 2B, cf. also FIGS. 1A, 1B, shows an embodiment of the aeration element 2, which in the shape of the base body 2 corresponds to the aerator of the AT 506 717. In this design of the mounting element 9, the lower retaining portion 12 of the retaining web 10 is formed as a region of the mounting portion 11.

FIGS. 4A to 4D schematically show the individual steps in the assembly of the aeration element 2 in the mounting element 9. According to FIG. 4A, the mounting element 9 is mounted in the clarifying basin. Then, the aeration element 2 is inserted in the mounting element 9, wherein the one side (the right side in the picture) of the base body 3 is arranged below the upper retaining portion 12 of the one mounting element 9. Thereafter, the aeration element 2 is pressed downwards, whereupon the retaining web 10 of the other mounting element 9 is resiliently deflected to the outside. The transition region between the retaining web 10 and the mounting portion 11 is formed as a joint, which allows pivoting of the retaining web 10 outwards from the rest position indicated by dotted lines and into the pivot position shown by solid lines. This allows the aeration element 2 to slide below the upper retaining portion 12 of the retaining web 10. Due to the inherent elasticity of the material of the mounting element 9, the retaining web 10 then returns to its rest or initial position, whereby the positive connection between the aeration element 2 and the mounting element 9 is caused (FIG. 4D). The retaining web may be pressed outwards by actuation of the grip element 15 to remove the aeration element 2 from the mounting device 8.

Figure 5:
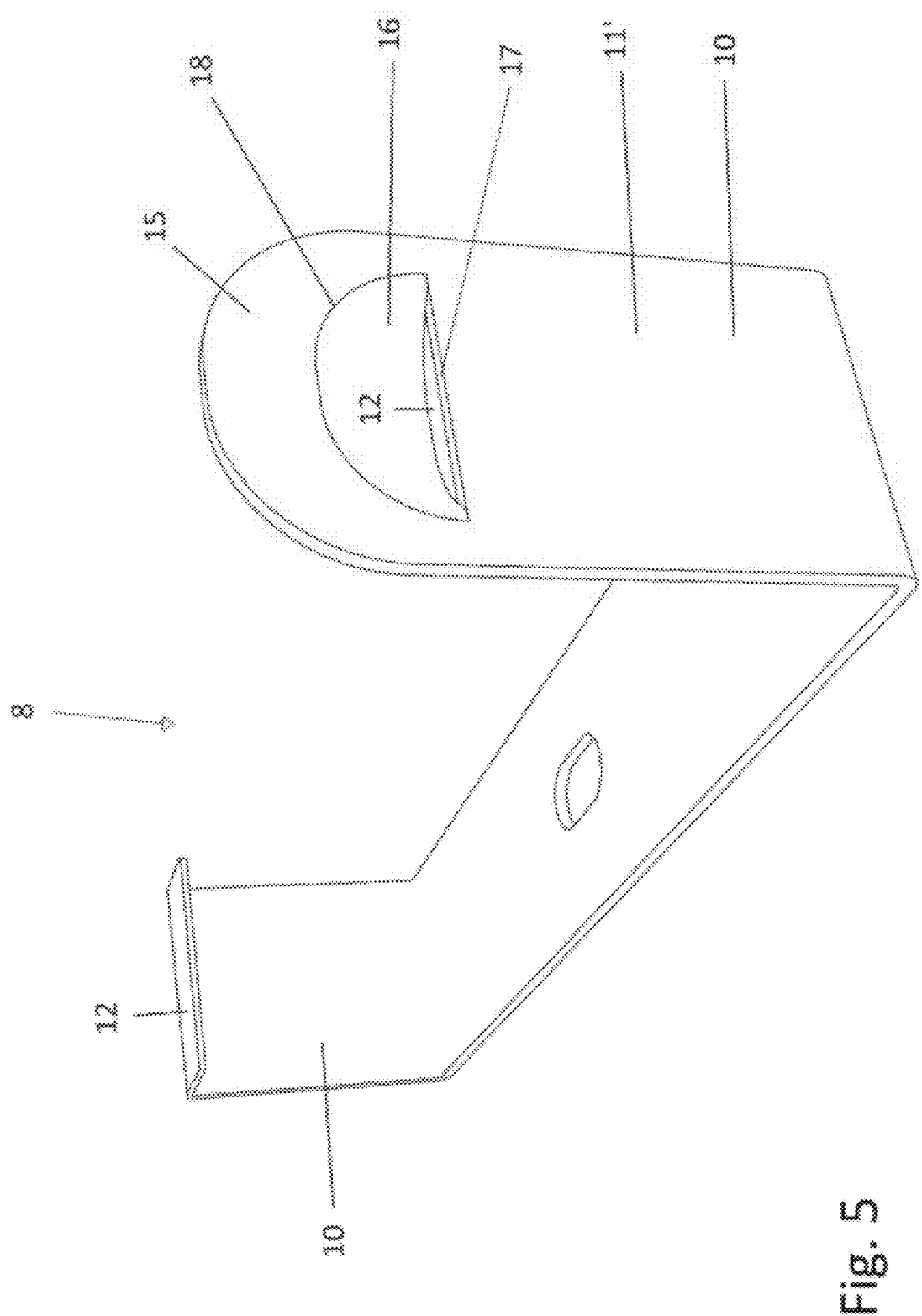
FIG. 5 is a view of an alternative embodiment of a mounting device.
Figure 6:
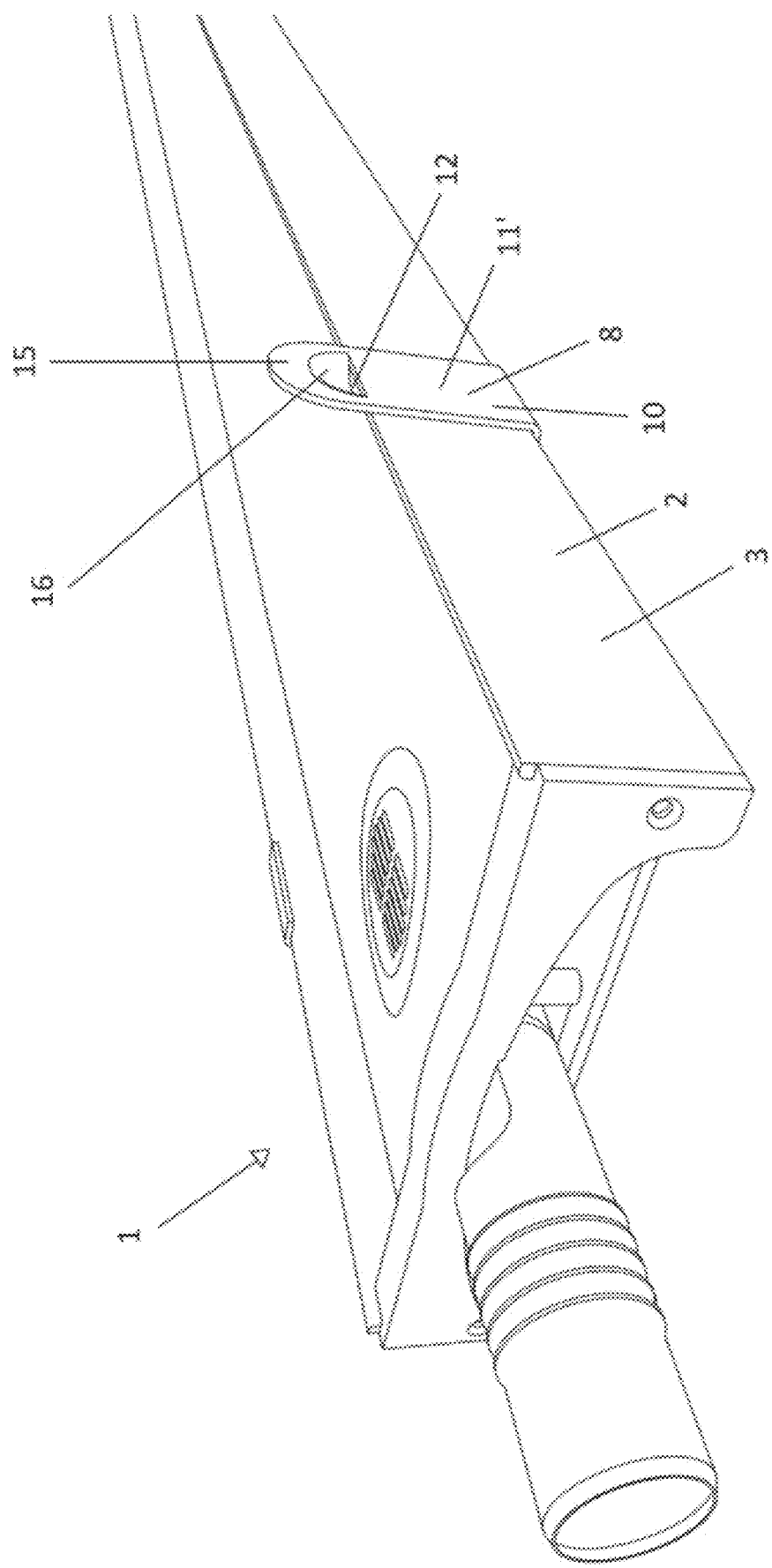
FIG. 6 is a view of an aerator with the mounting device according to FIG. 5.

FIG. 5 shows an alternative embodiment of the mounting device 8 for mounting the aeration element 2 in the clarifying basin. FIG. 6 shows the aerator 1 including the mounting device 8 of FIG. 5. The mounting element 9 comprises two retaining webs 10 for detachably connecting to the sidewalls 6 of the base body 3 of the aeration element 2. In the shown embodiment, one of the retaining webs 10 is connected to a grip element 15, which in the mounted operating state projects upward beyond the aeration element 2. Thus, the grip element 15 can be operated for the elastic deflection of the retaining web 10. Of course, however, also both retaining webs 10 may be connected to a respective grip element 15. The grip element 15 and the retaining web 10 are formed integrally, such as in the above embodiments. In contrast thereto, the grip element 15 is formed by an extension or continuation of the limiting section 11' of the retaining web 10 which limited section 11' is especially vertical in the mounted operating state. Thus, the grip element 15 is arranged in the same plane as the limiting portion 11' of the retaining web 10. To design the upper retaining portion 12 of the retaining web 10, which upper retraining portion 12 is arranged essentially horizontally in mounted the operating state, the grip element 15 has a recess 16, which is shaped according to the upper retaining portion 12. On the bottom side, the recess 16 is limited by an edge 17 between the upper retaining portion 12 and the limiting portion 11' of the retaining web 10. In the illustrated embodiment, the upper retaining portion 12 is substantially trapezoidal. On the upper side, the recess 16 is limited by a bending line 18. In the production, a cutting line 19 corresponding to the upper retaining portion 12 is provided, whereupon the bending line 18 is formed in the grip element 15 prolonging the retaining web 10.

Figure 7:
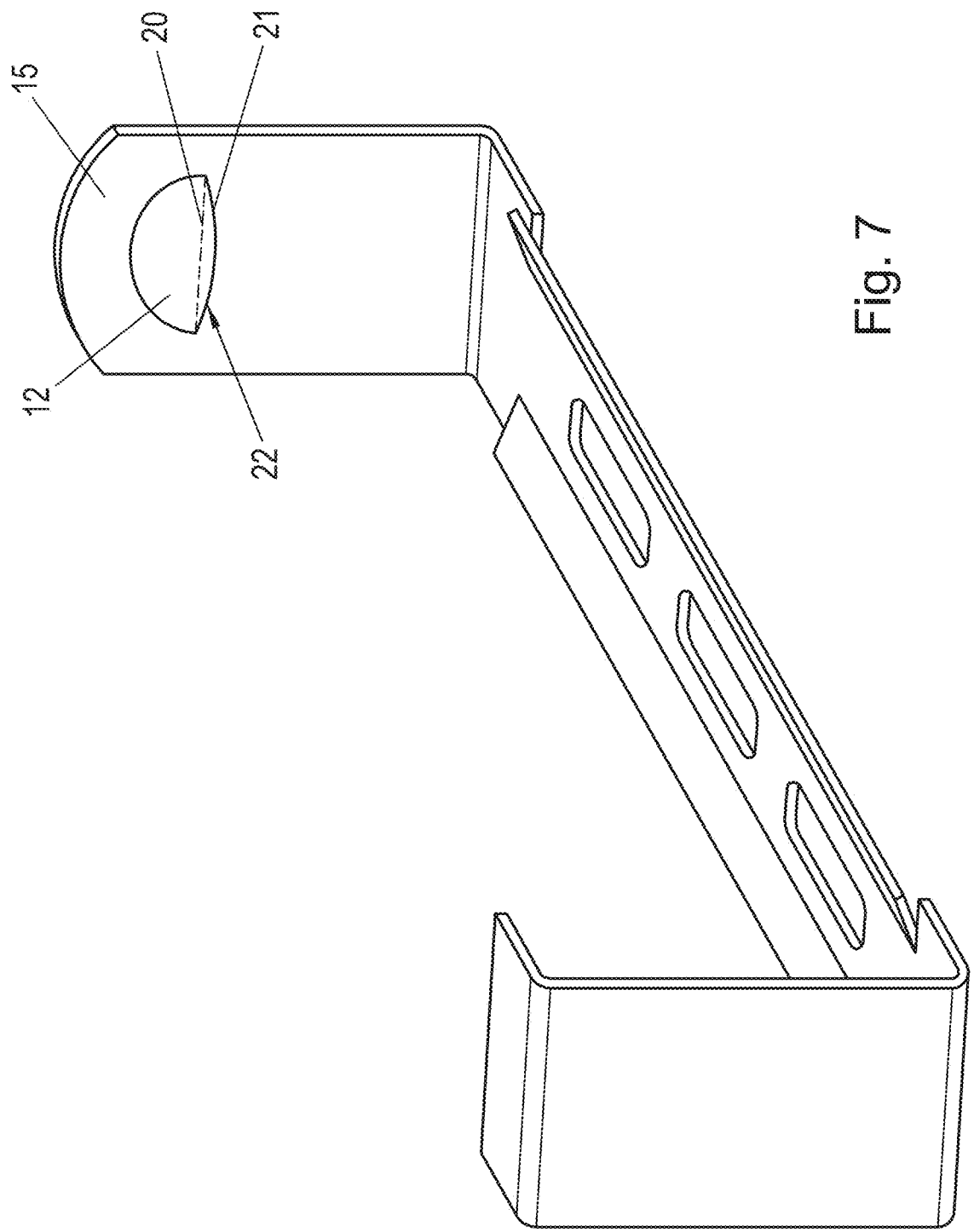
FIG. 7 schematically shows an alternative embodiment of a mounting device.

FIG. 7 schematically shows a further embodiment of the mounting element 9. In this embodiment, the grip element 15 has a substantially straight cutting line 20, wherein a portion of the grip element adjacent thereto is bent inwardly for the design of the upper retaining portion 12. In this embodiment, the upper retaining portion 12, in the mounted state, rests on the upper side of the sidewall 6 of the aeration element 2 by means of its lower edge 21. In the shown embodiment, the lower edge 21 of the upper retaining portion has an essentially trapezoidal course. A horizontal clearance 22 is provided between the lower edge 21 of the upper retaining portion 12 and the essentially straight cutting line 20 on the grip element 15, which clearance is connected to the recess 16 of the grip element 15, which recess is formed in accordance with the upper retaining portion 12 and extends in a vertical plane. This embodiment is distinguished by a particularly simple production.

As can be further seen in FIG. 7, in this embodiment, the mounting element 9 comprises upwardly bent longitudinal edges on the retaining portion 11, by means of which the stiffness of the mounting element 9 is increased.

The invention claimed is:

1. An aerator with an aeration element for introducing a gas into a liquid and with a mounting device for mounting the aeration element, wherein the aeration element comprises a base body having at least one upwardly-projecting planar sidewall, wherein the mounting device comprises a mounting element for connecting to the at least one upwardly-projecting planar sidewall of the base body of the aeration element, wherein the mounting element further comprises at least one elastically deflectable retaining web for detachably connecting to the at least one upwardly-projecting planar sidewall of the base body of the aeration element by a snap-fit, wherein the aeration element is inserted from above, and wherein the at least one elastically deflectable retaining web of the mounting element, in a mounted state, rests on an upper surface of the at least one upwardly-projecting planar sidewall of the base body of the aeration element.

2. The aerator according to claim 1, wherein the base body of the aeration element is arranged displaceably in a longitudinal direction between the at least one elastically deflectable retaining web of the mounting element.

3. The aerator according to claim 1, wherein the base body comprises a clamping groove in a lateral edge region for clamping a membrane element with passage openings for the gas, wherein the clamping groove is limited on an outside by the at least one upwardly-projecting planar sidewall of the base body of the aeration element.

4. The aerator according to claim 1, wherein the mounting device is configured for mounting the aeration element in a clarifying basin.

5. The aerator of claim 1, wherein the mounting element of the mounting device is a one-piece profile part.

* * * * *